United States Patent [19]
Gambill et al.

[11] 3,764,243
[45] Oct. 9, 1973

[54] MOLDED PRODUCT AND APPARATUS FOR PRODUCING SAME

[75] Inventors: Ulysses T. Gambill; Gregory C. Brock, Jr., both of Granville, Ohio

[73] Assignee: Owens-Corning Fiberglas Corporation, Toledo, Ohio

[22] Filed: July 13, 1970

[21] Appl. No.: 54,541

[52] U.S. Cl. ................. 425/3, 425/109, 425/156, 425/165, 425/167, 425/296, 425/408, 425/453
[51] Int. Cl. ............................................. B29c 3/04
[58] Field of Search ................. 18/17 E, 17 H, 17 P, 18/17 Z, 17 R, 4 P, 35, 4 B, 5 A, 19 R, 19 P, 5.3 R, 5.3 F, 5.3 H, 5.3 P, DIG. 258; 25/2, 42; 425/352-355, 453, 3, 260, 407, 408, 104, 156, 109, 165, 167, 384, 302, 296

[56] References Cited
UNITED STATES PATENTS

| | | | |
|---|---|---|---|
| 3,025,566 | 3/1962 | Kostur | 18/19 N UX |
| 2,976,658 | 3/1961 | Kostur | 18/19 N UX |
| 993,970 | 5/1911 | Droitcour | 18/5.3 H UX |
| 3,353,236 | 11/1967 | Stedman | 25/2 |
| 3,303,533 | 2/1967 | King | 18/17 E |
| 3,412,427 | 11/1968 | Flusfeder et al. | 18/5.3 P |
| 2,877,531 | 3/1959 | Heine | 425/DIG. 35 |
| 3,518,334 | 6/1970 | Corrigan et al. | 425/384 X |
| 2,639,465 | 5/1953 | Green et al. | 425/408 X |
| 2,710,988 | 6/1955 | Willcox et al. | 425/408 X |
| 3,166,790 | 1/1965 | Keyes | 425/302 |
| 2,685,117 | 8/1954 | Rivers | 425/260 |

FOREIGN PATENTS OR APPLICATIONS 1,185,651  3/1970  Great Britain ................. 18/5.3 P

*Primary Examiner*—Robert L. Spicer, Jr.
*Attorney*—Staelin & Overman

[57] ABSTRACT

The disclosure embraces a method of and apparatus for molding a product and the product produced thereby and involves delivering a supported body or mass of material that may be molded such as mineral fibers impregnated with a binder into a contoured molding facility, the body or mass of material being compressed and shaped to the mold contour, the binder set or cured and the molded product removed from the mold concomitantly with the advance of a succeeding supported mass or body of moldable mineral into the molding facility.

17 Claims, 19 Drawing Figures

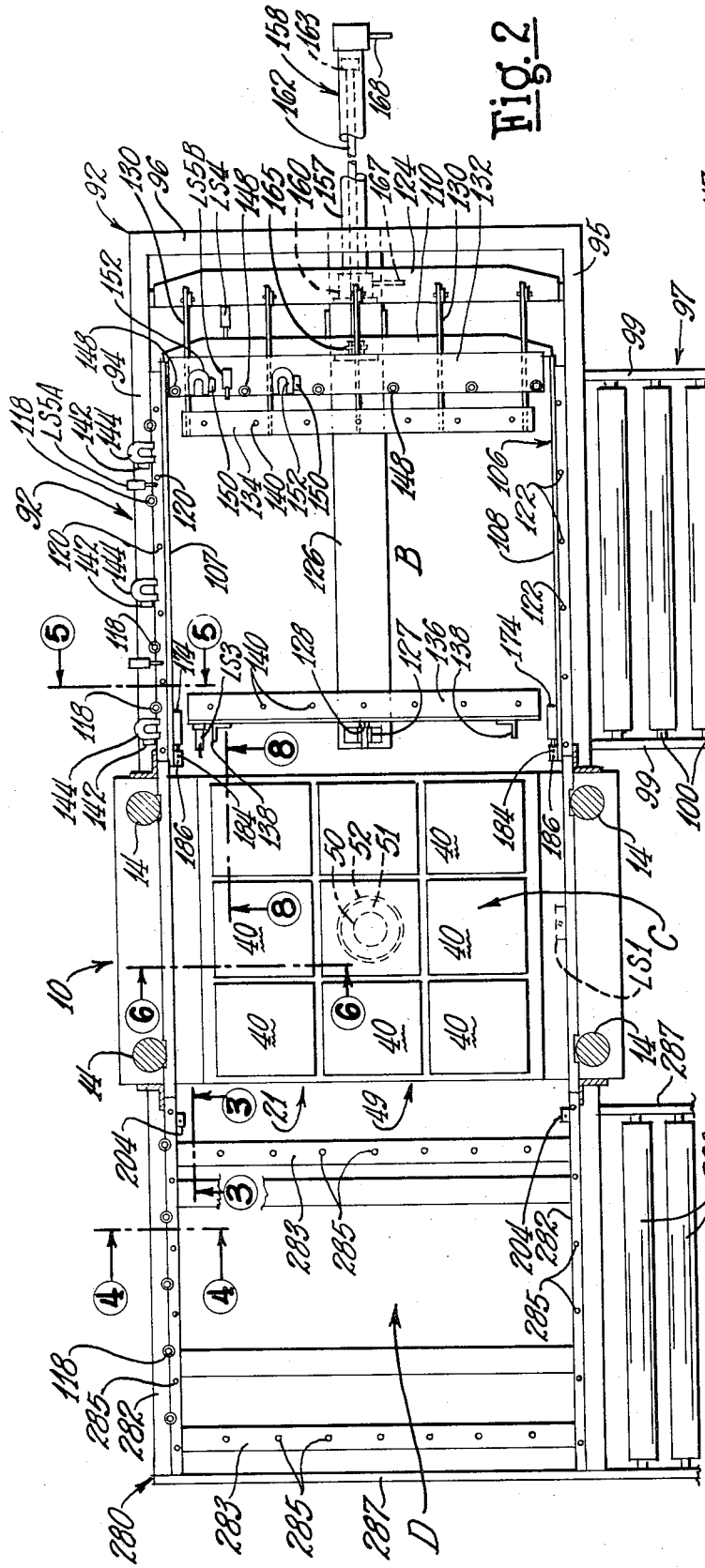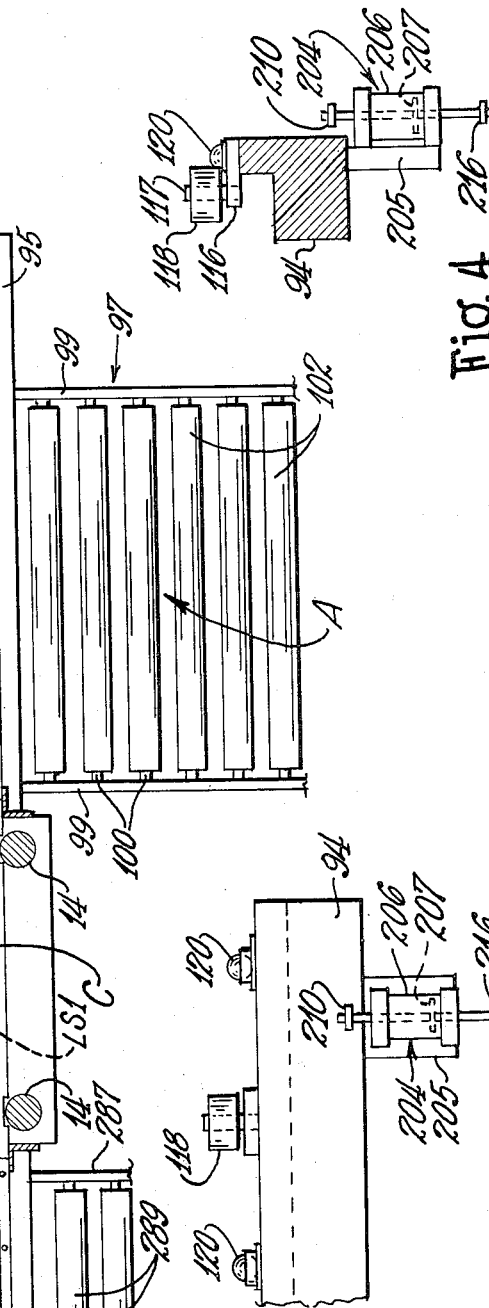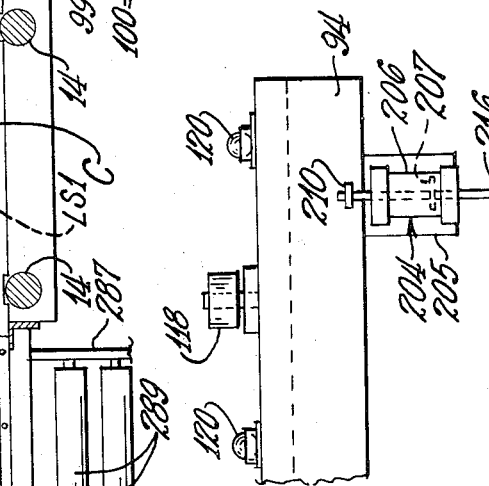

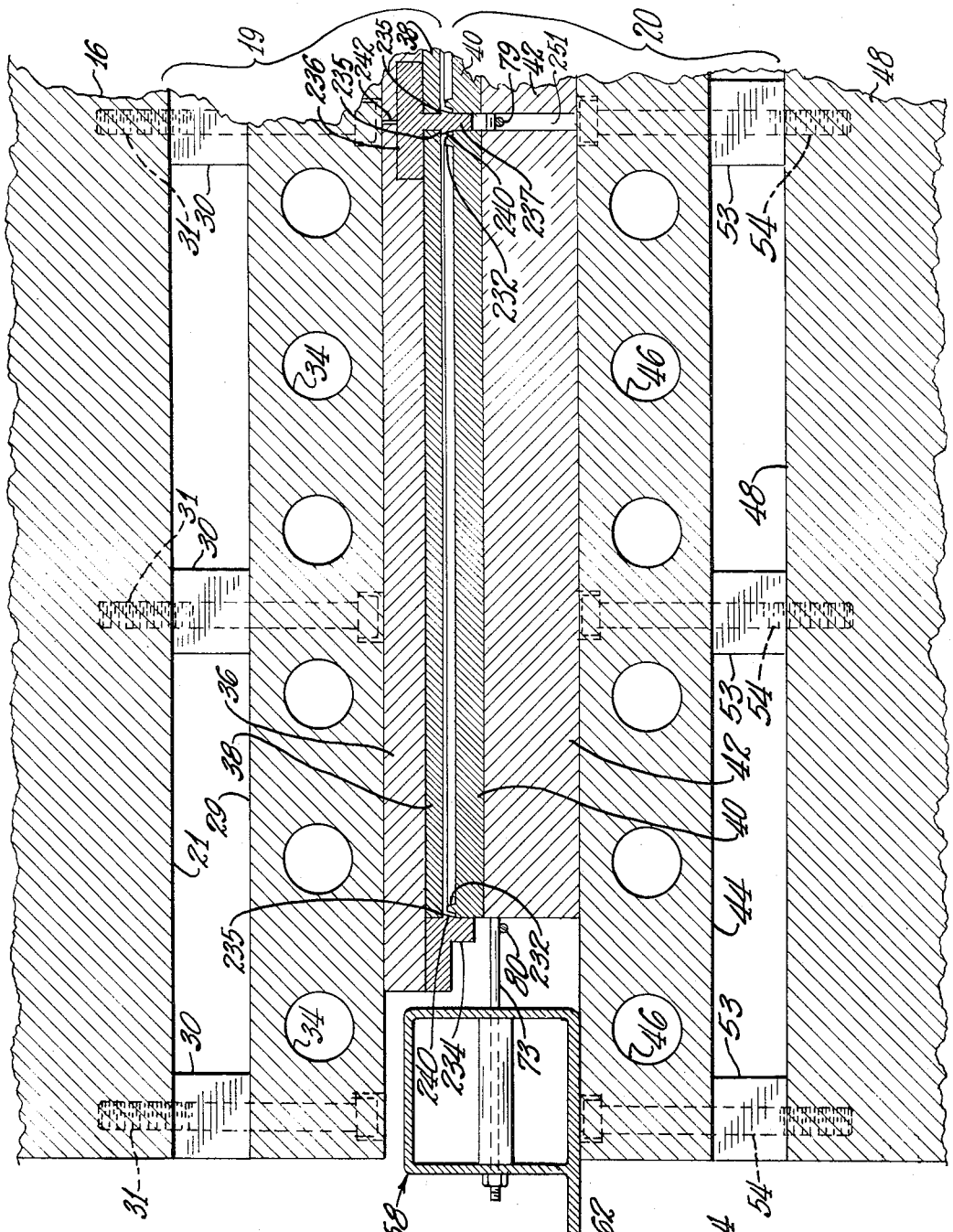
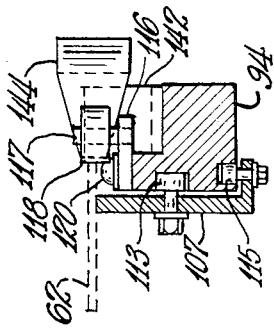
Fig. 5
Fig. 7
INVENTORS
ULYSSES T. GAMBILL &
BY GREGORY C. BROCK, JR.
ATTORNEYS

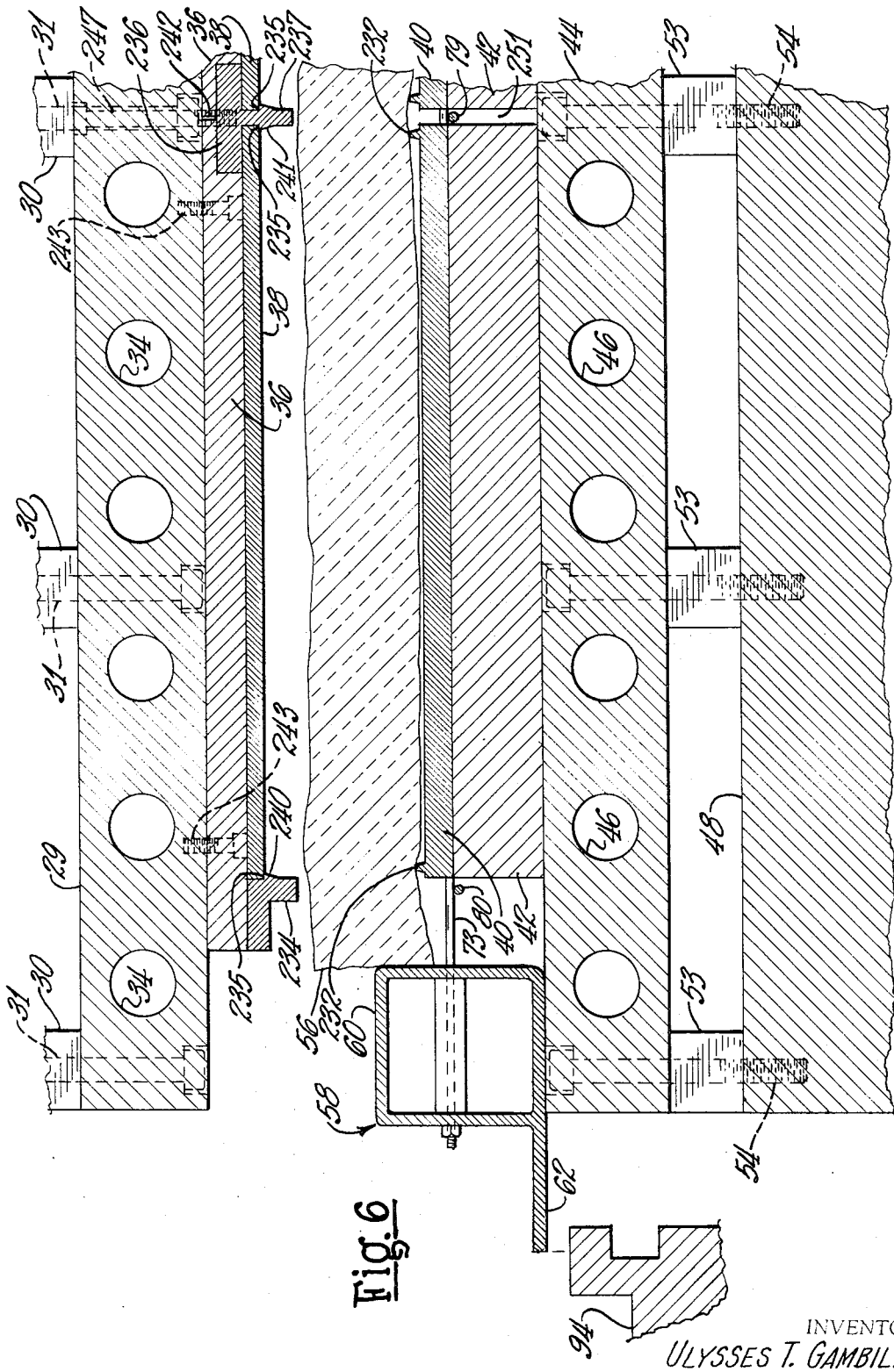

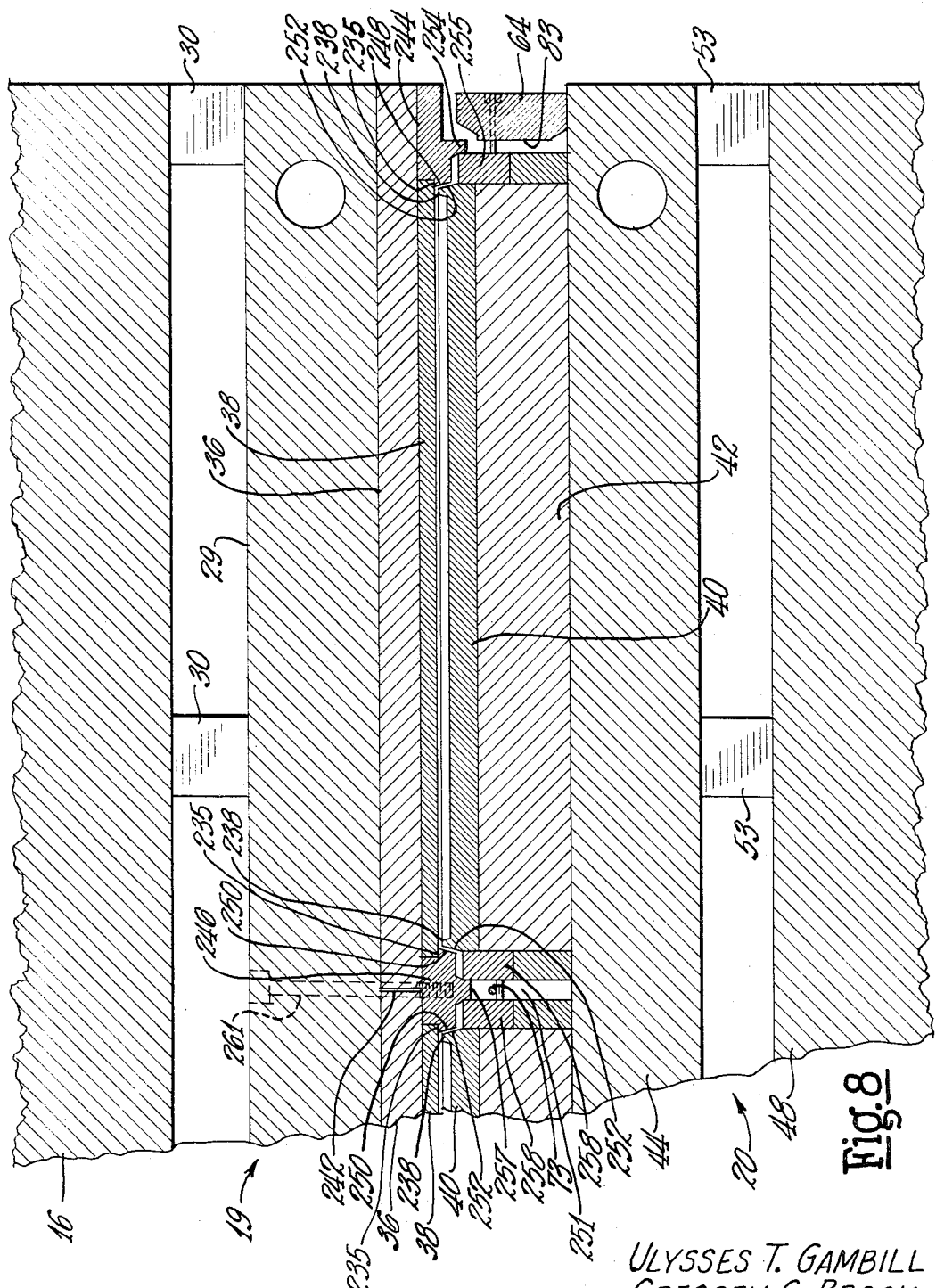

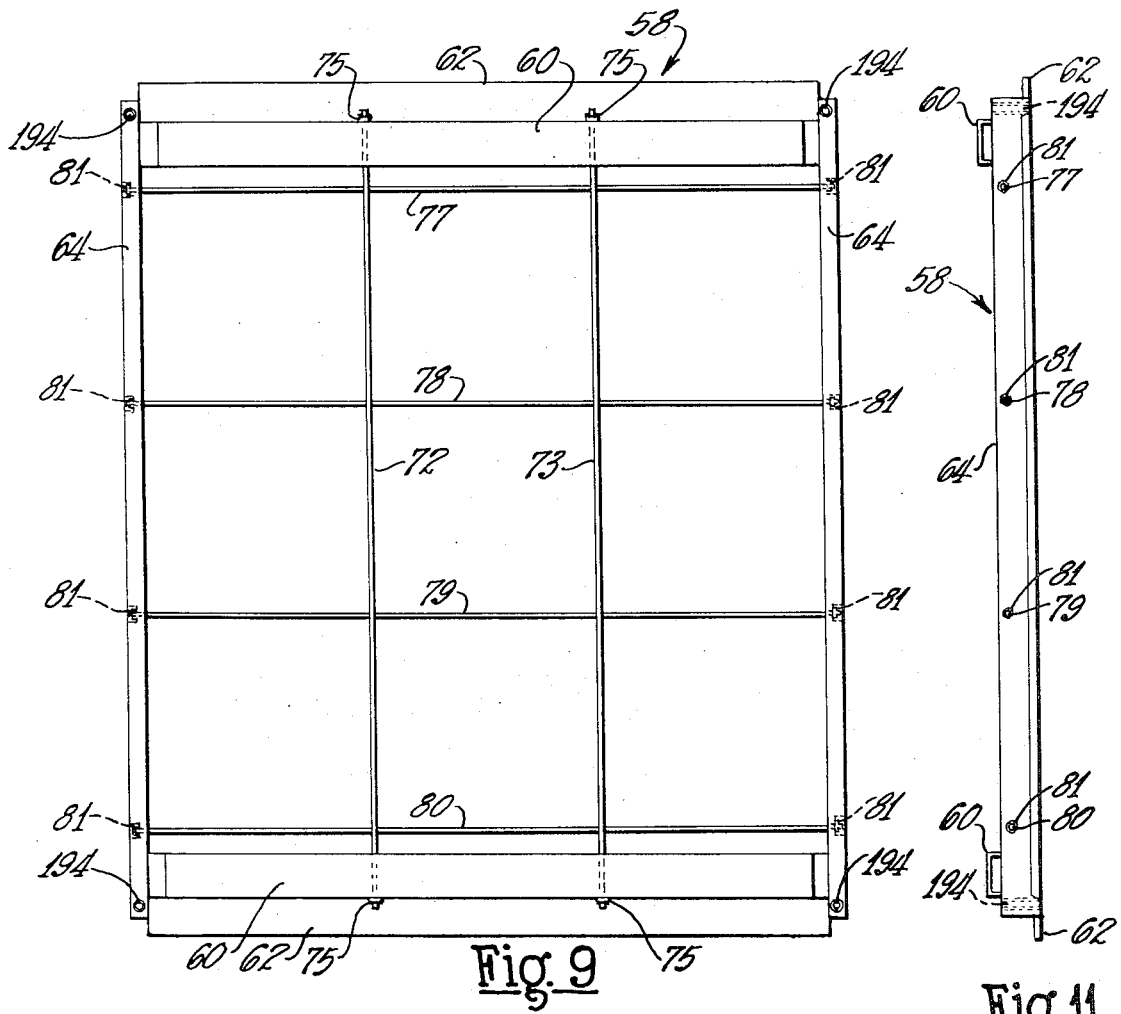

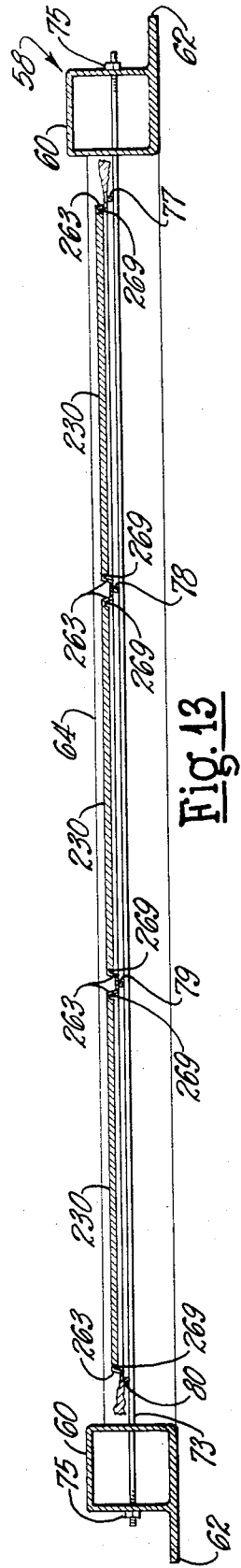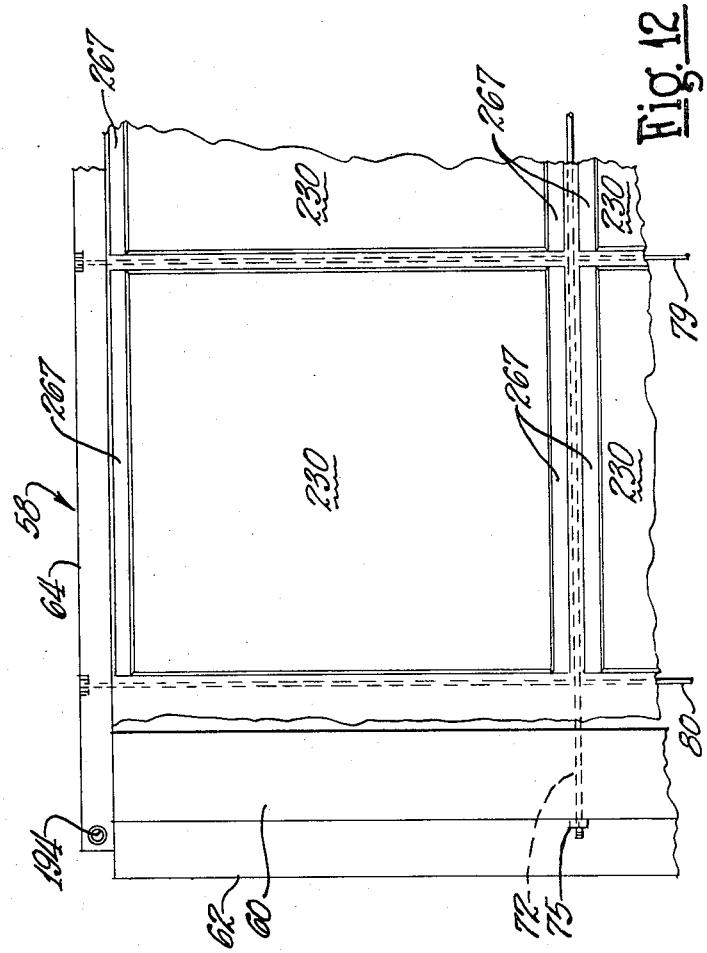
ULYSSES T. GAMBILL &
GREGORY C. BROCK, JR.
INVENTORS

ULYSSES T. GAMBILL &
GREGORY C. BROCK, JR.
INVENTORS

MOLDED PRODUCT AND APPARATUS FOR PRODUCING SAME

This invention more especially relates to a method of and apparatus for molding panels, tiles or bodies especially usable for surfacing ceilings and walls of rooms wherein a panel is molded of binder-impregnated mineral fibers, such as glass fibers. The molded panel may be configured to visually present an appearance of a plurality of molded acoustic tiles or the molded panel may be subdivided into individual tiles or units.

It has heretofore been a practice to mold acoustic tiles of mineral fibers, each as an individual tile as, for example, an acoustic tile of standard dimension, such as a tile twelve inches square or sixteen inches square. In fabricating individual tiles, the mold is configured to fashion a single tile at a molding operation and such method is comparatively time consuming as each tile requires a predetermined curing time. The heretofore known methods provide low production, the application of heat during each molding cycle for curing the binder in each individual tile, hence resulting in high costs of producing tiles.

The invention embraces a method wherein a body or mass of moldable material such as a body or quantity of mineral fibers, particularly glass fibers, is conveyed to a molding facility in a manner whereby the body of moldable material is supported and disposed in the molding facility without disruption of the body, and the material of the body compressed and contoured in the molding facility providing a plurality of connected similarly-shaped sections or units.

Another object of the invention resides in a method of processing a body or mass of moldable material such as mineral fibers to concomitantly form a plurality of substantially rigid fibrous bodies, sections or acoustic tiles wherein a mass or mat of mineral fibers, such as glass fibers, bearing an uncured binder is conveyed by a carrier or support into a molding facility, compressing the mass or mat of fibers to a comparatively high density and curing the binder in the compressed mass, the molding facility being configured to provide a molded product wherein the plurality of rigid fibrous bodies, sections or tiles are of substantially identical configuration and in connected relation.

Another object of the invention resides in an arrangement for molding a plurality of fibrous bodies, sections or tiles concomitantly in connected relation wherein a mass or mat of binder-bearing fibers, such as glass fibers, is conveyed by a reticulated support into a molding facility and wherein the reticulated support is disposed in the molding facility during the compression of the fibers and the curing of the binder without impairing the mat-supporting function of the reticulated support.

Another object of the invention resides in a molding facility or press associated with carrier for conveying a body or mass of moldable material to the molding press, the carrier being disposed to guide and align the body or mass in the press, and at the completion of a molding cycle, the carrier conveys the molded product from the press.

Another object of the invention embraces a tray or carrier for conveying a body of moldable material such as a mat of fibers into the molding facility, the tray or mat carrier embodying spaced rectilinear means for supporting the body which is moved with the body into molding position and remains within the molding facility during molding operations.

Another object of the invention embraces the provision of a tray or carrier adapted to support a mat of binder-bearing fibers for conveying the mat of fibers into the molding facility the arrangement including means for positively aligning the carrier and mat adjacent the mold sections of the molding facility whereby the mat of fibers is compressed and shaped by the closed mold sections without interference with the mat supporting carrier, the mold sections being heated for curing or setting the binder in the compressed fibers in the molded bodies, the mold sections being configurated to provide integral compressed fibrous connections between adjacent molded bodies preventing dislodgement of the bidies during processing.

Another object of the invention embraces an arrangement wherein means is effective for moving a carrier for a fibrous mat into position between the molding sections and concomitantly ejecting a carrier and completed molded product from the region between the mold sections.

Further objects and advantages are within the scope of this invention such as relate to the arrangemnt, operation and function of the related elements of the structure, to various details of construction and to combinations of parts, elements per se, and to economies of manufacture and numerous other features as will be apparent from a consideration of the specification and drawing of a form of the invention, which may be preferred, in which:

FIG. 2 is a top plan view of the arrangment shown in FIG. 1 with the upper frame structure of the molding press and the uppermost die section removed;

FIG. 3 is an enlarged fragmentary view taken substantially on the line 3—3 of FIG. 2;

FIG. 4 is an enlarged detail sectional view taken substantially on the line 4—4 of FIG. 2;

FIG. 5 is an enlarged detail sectional view taken substantially on the line 5—5 of FIG. 2;

FIG. 6 is an enlarged fragmentary sectional view through the upper and lower molding dies with the dies in open position with a mat of fibers in molding position, the section being taken substantially on the line 6—6 of FIG. 2;

FIG. 7 is a sectional view through the molding dies shown in FIG. 6 with the molding dies in closed or product molding position;

FIG. 8 is a fragmentary sectional view through the molding dies, the view being taken substantially on the line 8—8 of FIG.2;

FIG. 9 is a plan view of a carrier or tray for supporting a fibrous mass or mat during a molding operation;

FIG. 10 is an end view of the construction shown in FIG. 9;

FIG. 11 is a side view of the construction shown in FIG. 9;

FIG. 12 is a fragmentary top plan view showing a portion of the carrier and molded product formed in the molding facility;

FIG. 13 is a transverse sectional view through the tray and molded product supported by the tray;

Figure 1:
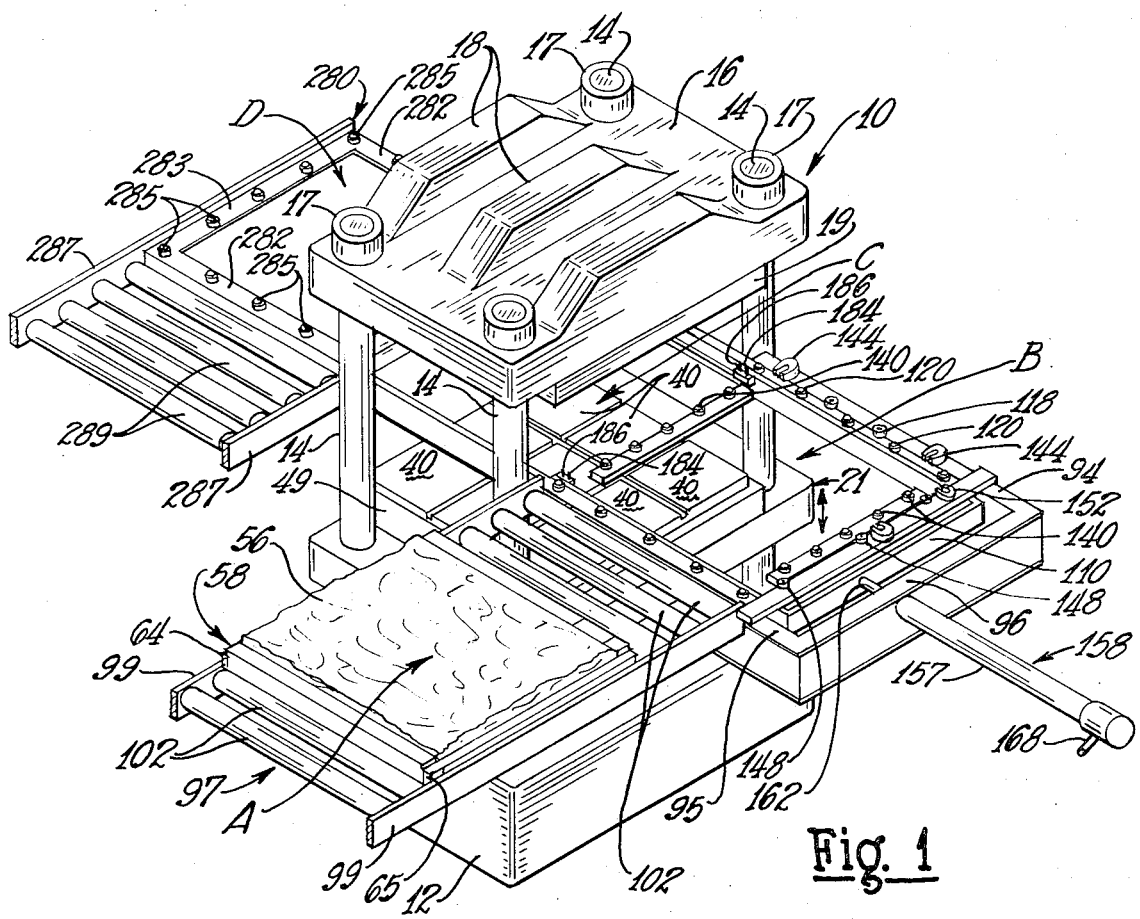
FIG. 1 is an isometric view of a molding press illustrating the lower mold section associated with apparatus for moving a body of fibers and its supporting carrier into and away from the region of the molding dies.

The method and apparatus of the invention are especially adapted for simultaneously molding or forming a plurality of bodies, surfacing units, panels or acoustic tiles fashioned of glass fibers and the glass fibers bonded by a cured binder. It is to be understood however that other suitable moldable materials such as moldable resins may be employed in forming a plurality of molded bodies or units by the method and apparatus of the invention.

In the illustrated embodiment of the apparatus for molding panels or acoustic tiles of mineral fibers, such as glass fibers, the arrangement is inclusive of a molding press 10 comprising a base structure 12 of substantially rectangular shape. Secured to the base and extending upwardly therefrom are frame members, struts or rods 14. Mounted upon the upper ends of the struts or rods 14 and supported thereby is a plate or frame member 16 secured on the rods by threaded members or nuts 17. The plate or platen 16 is fashioned with reinforcing ribs 18 to resist the forces occurring during molding operations.

Disposed beneath and carried by the plate or platen 16 is an upper matrix or die mounting assembly 19, the components of this assembly being shown in FIG. 7 and hereinafter described. The lower matrix or die mounting assembly and its associated components are indicated at 20 in FIG. 7.

With reference to FIGS. 6, 7 and 8, there is disposed beneath the platen or plate 16 a die heating plate or manifold 29, the plate 29 being spaced from the platen 21 by cubically shaped spacer blocks 30 and secured to the platen 16 by bolts 31 extending through aligned openings in the heating plate and the spacer blocks.

The heating plate 29 for heating the upper die assembly to cure the binder in the fibers is fashioned with passages or channels 34 through which a heated fluid, such as oil, is circulated. Disposed beneath and secured to the heating plate 29 is a plurality of die supporting or backing plates 36.

In the embodiment illustrated, the mold construction is inclusive of an upper die or matrix assembly comprising nine individual upper die sections 38, and the lower or mating die or matrix assembly embodies nine mating die sections 40, shown in FIGS. 1 and 2, for concomitantly molding nine fibrous bodies or surfacing tiles at each molding cycle. It is to be understood that while the illustrated embodiment provides for molding nine fibrous bodies or surfacing tiles concomitantly, a greater or lesser number of bodies or tiles may be molded at one cycle.

Each of the upper die sections 38, each being of the shape of an individual body or tile, is engaged with an individual backing plate or pad 36 supported by the upper heating manifold 29 in a manner hereinafter described.

Each of the die sections 40 of the lower mating matrix or die assembly, each being of the shape of an individual tile, is disposed on a backing plate, pad or platen 42, shown in FIGS. 6 and 7, there being an individual platen 42 for supporting each of the lower matrix sections 40. Supporting the platens 42 is a heating plate, block or manifold 44 having passageways or channels 46 therein accommodating circulating heated fluid, such as oil for heating the lower die sections 40 for curing the binder in the molded fibrous bodies or tiles.

A plate or bolster 48, which is mounted upon a vertically movable ram 49 of the press, carries heating manifold 44, platens or pads 42 and the lower matrix or die sections 40 through spacer blocks 53 disposed between the member or plate 48 and the manifold 44.

The plate 48 and press ram are mounted on the upper end of a piston rod 50 secured to a piston 51 reciprocable in a cylinder 52 of a hydraulic actuator for moving the ram. Oil may be used as the actuating fluid. The heating manifold 44 is secured in position on the member 48 by threaded members or bolts 54 extending into threaded openings in the member 48, as shown in FIGS. 6 and 7.

Referring to FIG. 6, the matrices or dies sections 38 and 40 are shown in open or separated positions with an uncompressed, unmolded mass or mat of fibers 56, such as glass fibers, disposed between the open die sections or matrices 38 and 40. The contour or configuration of the die sections or matrices 38 and 40 will be hereinafter described in further detail.

Means is provided for conveying a mat or body of glass fibers or other body of moldable material into molding position in the press between the sets of dies or die sections 38 and 40 and for supporting the body as it is conveyed into molding position and during the molding operation. The body supporting and conveying means, in the embodiment illustrated, comprises a carrier or tray 58 particularly illustrated in FIGS. 9 through 11.

The mat supporting tray or carrier 58 is of generally rectangular shape and comprises end frame members 60 which are preferably of hollow or tubular shape as shown in FIG. 13. Each of the end frame members is provided with an extension or planar strip forming an end rail 62.

The mat carrier or support means 58 includes side frame members or rails 64 welded or otherwise joined at their end regions to the end frame members 60. Extending transversely between and secured to the end members 60 are mat supporting wires or linear members 72 and 73 disposed in the manner shown in FIG. 9.

The wires or members 72 and 73 extend through openings in the walls of the tubular members 60, the ends of the wires being threaded to accommodate securing nuts 75. The securing nuts 75 may be drawn up to establish tension in the wire 72 and 73. Disposed transversely of the carrier frame and extending through openings in the side members or rails 64 are wires or linear members 77, 78, 79 and 80. The end regions of these wires are threaded to receive nuts 81 which may be drawn up to establish tension in the wires. If desired, resilient means such as conventional Bellville spring discs or washers may be used with the nuts 75 and 81.

As shown in FIG. 9, the upper surfaces of the side rails 64, the longitudinally disposed wires 72 and 73 and the transversely disposed wires 77, 78, 79 and 80 form a reticulated or grid support for a mat section 56 shown in FIGS. 1 and 6, and define nine spaces or zones, each space or zone being substantially square in the embodiment illustrated whereby nine tiles or molded fibrous bodies are formed during a single molding operation.

FIG. 2 is a plan view of the molding press with portions of the press removed for purposes of illustration, the view illustrating one form of means for delivering the carrier 58 and mat section 56 supported thereby into registration with the molding dies preparatory to a molding operation. The arrangement illustrated includes antifriction support means for the mat carrier 58 whereby the mat carrier is readily moved with a minimum of friction to a position preparatory to its advancement into tile molding position between the molding dies.

Disposed adjacent and secured to the molding press 10 and extending rearwardly of the press frame is a supplemental frame or frame structure 92 comprising side frame members or rails 94 and 95 and an end frame member 96. Disposed adjacent and extending normal to the frame member 95 is a roller support means 97 to accommodate a mat carrier or tray 58 such as that illustrated in FIGS. 9 through 11. The means 97 is inclusive of parallel frame members 99 joined by bars or shafts 100, the ends of the shafts, rods or bars 100 being fixedly secured to the frame members 99 to secure them in fixed spaced relation.

Rotatably supported on each of the shafts or rods 100 is a roller 102 mounted on antifriction bearings (not shown) in a conventional manner. The frame members 99 are spaced to accommodate the mat carrier or support 58 whereby the side rails of the carrier 58 have clearance space to facilitate movement of the mat carrier 58 from a station A toward an intermediate station B piror to its delivery into the region of the molding dies. In FIG. 1, the carrier 58, mounting a section 56, is illustrated as supported by the rollers 102 of the roller conveyor 97.

The arrangement illustrated in FIGS. 1 and 2 includes the intermediate station B for receiving a carrier 58 and mat supported thereby from the roller conveyor 97 preparatory to advancement or delivery of the carrier and mat into the molding dies. The carrier and mat advancing means include a movable frame or yoke 106 of U-shape comprising spaced side members 107 and 108 secured to a connecting member 110, the yoke 106 being reciprocable relative to stationary side members 94 and 95 of the frame structure 92.

As shown in FIGS. 2, 4 and 5, member 94 is provided with spaced projections 116, the projections carrying pins 117 on which are journaled guide rollers 118. The member 94 is provided with metal balls 120 contained in recesses in the member, the bearing balls 120 adapted to engage a strip or end rail 62 of the mat supporting tray 58, shown in FIG. 9. As shown in FIG. 5, member 94 is provided with lengthwise grooves accommodating guide members 113 and 115 for guiding member 107 of the yoke construction 106.

The frame member 95 is equipped with bearing balls 122 for supporting the strip 62 at the opposite end of a mat supporting tray 58 in the same manner as the member 94 at the opposite side of the frame structure 92. The bearing balls 120 and 122 provide antifriction support means facilitating movement of the mat supporting carrier 58 into and out of registration with the molding dies 38 and 40.

Means is provided for ease of movement of the tray from its position on the rollers 102 designated station A into the position or station B within the movable frame means or yoke 106 preparatory to delivery of the carrier and mat into registration with the molding dies designated station C. The stationary frame structure 92 is inclusive of a transversely disposed horizontally arranged member 124 having its ends secured to the frame members 94 and 95.

Extending longitudinally and midway between the members 94 and 95 is a frame member 126 secured to the frame member 124. Mounted upon the front end region of member 126 is a block 127 equipped with an adjustable stop screw or abutment 128 for limiting the forward movement of the skeleton frame or yoke 106 toward the molding dies. Secured to the transverse frame member 124 is a plurality of horizontal struts 130. Secured to and supported by the struts 130 is a plate or member 132 and a strip or bar 134 disposed in parallelism with the plate 132.

A second strip or bar 136 is disposed adjacent the molding dies, the strip 136 being supported by vertical frame members 138. Each of the bars or members 134 and 136 is fashioned with a plurality of spaced recesses, each of the recesses accommodating a bearing ball 140. The bearing balls in each bar are arranged in a single row and the distance between the two rows of bearing balls is equal to the distance between the median regions of the side members 64 of the mat carrier 58, shown in FIG. 9.

The rows of bearing balls 140 are in substantial parallelism with each other and with the side members 99 of the roller support 97 for a carrier 58 so that when the carrier and a mat of fibers carried thereby are moved from the roller support 97 into position at station B within the yoke member 106, the members 64 of the carrier or tray 58 engage the bearing balls 140 facilitating ease of movement of the carrier 58.

Means are provided for aligning the mat carrier 58 in proper position with respect to the yoke or movable frame 106 at station B. Arranged along the frame member 94 are brackets 142, each bracket supporting a magnet 144 preferably a permanent magnet of horseshoe shape, the poles of the magnet being disposed so that they are close to an end rail 62 of a mat supporting tray 58 when the latter is disposed within the yoke 106, the brackets and magnets supported thereby being illustrated in FIGS. 2 and 5.

As shown in FIG. 2, the carrier guide rollers 118 are arranged in a row with their axes disposed so that the peripheral surfaces of the rollers 118 are engaged with an end rail 62 of a mat carrier 58 under the influence of the magnets 144, the force of the magnets maintaining engagement of an end rail of the mat carrier with the rollers 118 to properly align the carrier for movement into the region of the molding dies. The rollers 118 are so disposed as to provide a slight clearance space between the tips of the poles of the magnets and an end rail of a mat carrier whereby the magnets influence the positioning of the mat carrier without engaging the carrier.

The transverse plate 132, shown in FIG. 2, is equipped with journally supported rollers 148 arranged in a row for engagement with a side rail of a mat carrier 58 when the latter is moved from the roller conveyor 97 into position at station B in the yoke 106. Mounted upon the plate 132 ara brackets 150, each bracket supporting a magnet 152. The rollers 148 are disposed with respect to the magnets 152 so that when a mat carrier 58 is moved into position within the yoke 106, the carrier is influenced by the magnets 152 to properly align the carrier with a side rail of the carrier in engagement with the rollers 148 with slight clearance space between the carrier rail and the magnets.

Means is provided for effecting reciprocatory movement of the yoke 106 to move a mat tray or carrier 58 and fibrous mat 56 supported thereby into registration with the molding dies, and for removing or ejecting a molded tile assembly or product and its carrier away from the molding dies after a molding and heat curing cycle has been completed. In the illustrated embodiment, an air actuator 158 is utilized to reciprocate the yoke or movable frame 106. Extending through an opening in the frame member 96 is a cylinder 157 of the actuator 158, an end head 160 of the cylinder 157 being secured to the stationary frame member 124.

A piston rod 162 is equipped with a piston 163 reciprocable in the cylinder, the rod extending through the cylinder head 160 and being secured to the yoke member 110 by means of a clevis and pin connection indicated at 165. Air or fluid conveying tubes 167 and 168 are connected to the heads of the cylinder for conveying air into and away from the cylinder to effect reciprocation of the piston 163 in both directions. Conventional solenoid controlled valve means (not shown) is employed for controlling the delivery of compressed air into and exhausting air from the cylinder.

Means is provided associated with the yoke or carrier-moving frame 106 for engagement with a tray or carrier 58, supporting a mat 56 of fibers, in readiness at station B for movement into registration with the molding dies and for connection with the mat carrier or tray in registration with the molding dies for moving the latter tray carrying a molded product or assembly unit of molded tiles or bodies out of registration with the molding dies.

Figure 14:
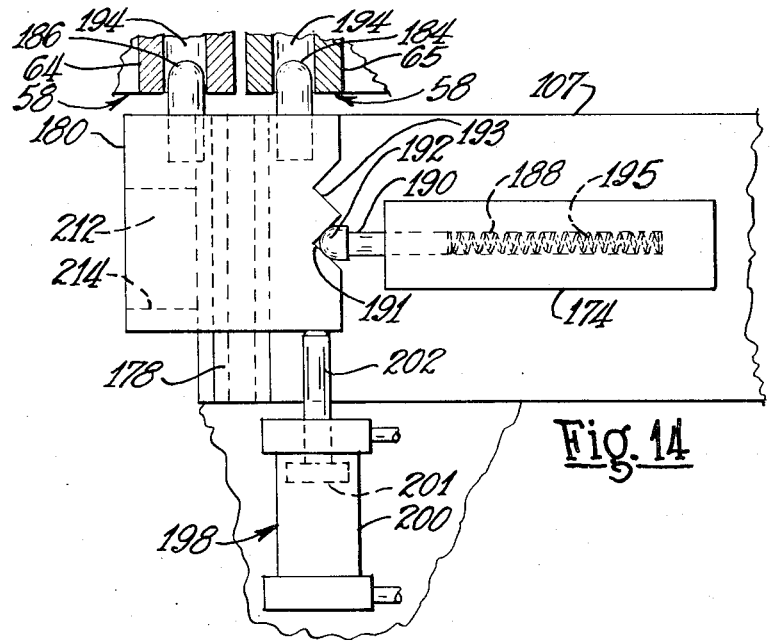
FIG. 14 is a fragmentary elevational view of an arrangement engageable with the mat carriers for moving the carriers into and out of registration with the molding dies.
Figure 15:
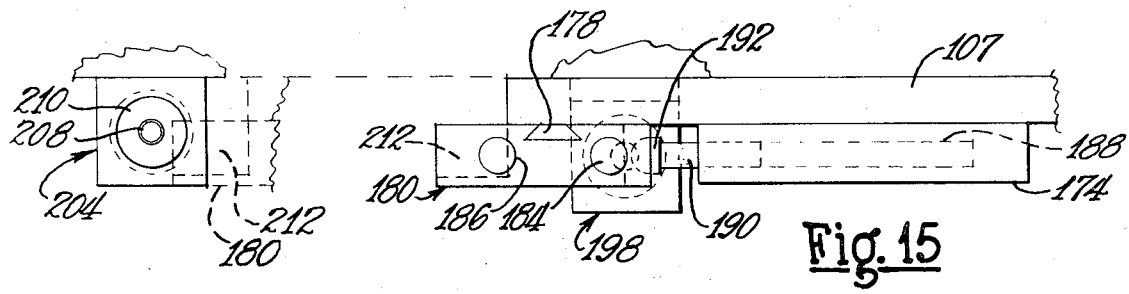
FIG. 15 is a top plan view of the arrangement shown in FIG. 14.

As particularly shown in FIGS. 14 and 15, the end region of the yoke bar 107 is equipped with a member or block 174 secured to the bar. A similar block 174 is secured to the opposite yoke arm or member 108. A dovetail-shaped guide member 178 is secured to each of the yoke members 107 and 108. The angular guide surfaces of member 178 are disposed vertically. Slidably mounted upon each of the dovetail-shaped members 178 is a slide, block or pin carrier 180, the vertically disposed surfaces of the guide member 178 providing for vertical slidable movement of the pin carrier 180 with respect to the block 174. Each of the pin carriers 180 is equipped with two tray-engaging members or pins 184 and 186, the pins being fixedly secured in bores in the block 180.

Means is provided for indexing or moving each vertically slidable block 180 to two positions with respect to the yoke members 107 and 108. Each block 174 is provided with a bore 188 which slidably accommodates a tenon portion 190 of a detent or means 192, the detent having a semispherically shaped end as shown in FIG. 14. A spring 195 biases the detent 192 toward the block or pin carrier 180. Means are provided for moving the slidable member or pin carrier 180 in vertical directions to effect engagement and disengagement of the pins 184 and 186 with trays 58.

The yoke 106 is illustrated in retracted position in FIG. 2 in which position a tray 58, supporting a mat or body of fibers, shown in FIG. 1, may be moved into position at station B adjacent the yoke 106 whereby the yoke, moving in a left-hand direction as viewed in FIG. 2, conveys the tray and mat into registration with the molding dies 38 and 40. As shown in FIG. 9, openings or bores 194 are provided in the ends of the rails 64, one at each corner of the mat-supporting tray or carrier 58, these openings accommodating the pins 184 for conveying the tray and mat into registration with the molding dies and accommodating the pins 186 for conveying a tray 58 carrying a molded tile assembly or product out of registration with the molding dies.

Means is provided for moving each of the members or pin carriers 180 in an upward direction to engage the pins 184 and 186 with adjacent trays 58 and for retracting each member 180 for disengaging the pins 184 and 186 from trays 58. There is disposed beneath each of the pin carriers or members 180 an actuator or means 198 for effecting upward movement of the pin carrier 180, the actuators being secured to frame portions of the molding press. In the embodiment illustrated the actuators 198 are fluid actuated as, for example, by compressed air.

Figure 16:
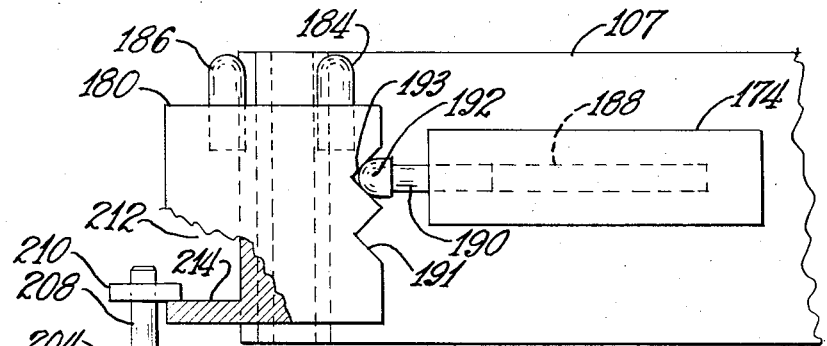
FIG. 16 is a fragmentary elevational view of means for disengaging the mat carrier moving means from the carriers.

Each actuator 198 includes a cylinder 200 accommodating a slidable piston 201 secured on a rod 202 which extends upwardly from the cylinder 200. Air under pressure delivered into the lower end of the cylinder 200 elevates the piston 201 and rod 202, the latter engaging the pin carrier 180 moving the pin carrier upwardly for engagement with trays 58 when the yoke 106 is in retracted position, shown in FIG. 2. A pair of second actuators of means 204, one of which is shown in FIG. 16, preferably of the fluid actuated type, is fixedly positioned at the tray-discharge region of the molding press for moving the pin carriers or blocks 180 downwardly to disengage the pins 184 and 186 from mat supporting trays 58.

In the embodiment illustrated, each of the means 204, supported by a member 205 depending from member 94 shown in FIGS. 3 and 4, is inclusive of a cylinder 206 accommodating a slidable piston 207 mounted on a rod 208 extending upwardly from the cylinder, the rod being equipped with a member or collar 210. Each block or pin carrier 180 is fashioned with a recess 212 providing a ledge 214 adapted to be engaged by the collar 210. By delivering air under pressure to the cylinder 206 above the piston 207, the rod 208 and member 210 move downwardly, the member or collar 210 engaging the ledge 214 and moving the pin carrier or block 180 downwardly to withdraw the pins 184 and 186 from the bores 194 in adjacent mat carriers or trays 58.

The arrangement includes means for controlling delivery of fluid under pressure into the yoke actuating means 158 upon withdrawal of the pin carriers 180 to their lowermost or disengaged positions. The piston rod 208 of one of the cylinders 206 projects beneath the cylinder and is equipped with a collar or member 216. Disposed adjacent the member 216 is a C-shaped member 218 pivoted upon a pin 220. The member 218 is fashioned with arms 222 and 223 disposed in the path of movement of the member 216. The member 218 functions as a toggle means arranged to operate a limit switch LS6 in circuit withthe solenoid of a four-way valve of conventional construction (not shown) for controlling the delivery of pressure fluid, such as air, into and out of the ends of the cylinder 157 of the yoke actuator 158 to effect reciprocation of the yoke 106.

The actuator 198 is controlled by a conventional solenoid actuated valve means (not shown) actuated by a switch (not shown) set into operation by opening of the molding dies 38 and 40 at the completion of a molding cycle. Fluid pressure activates the actuator 204 through a conventional solenoid operated valve, the latter being controlled by a switch LS2 shown schematically in FIGS. 16 and 19. When the yoke 106 has moved a tray 58 carrying a mat 56 into registration with the molding dies, switch means is actuated by an abutment (not shown) to actuate a solenoid operated valve to direct compressed air into the upper end of the cylinder 206 above the piston 207.

The downwardly acting pressure engages the collars 210 on the piston rods 208 with the ledges 214 on members 180 and moves the members 180 downwardly to their lowermost position. During this movement, the detents 192 in registration with the recesses 191 are retracted and, when the members 180 reach their lowermost positions, the detents are engaged with the recesses 193, holding the members 180 in their lowermost positions. Downward movement of members 180 withdraws the pairs of pins 184 and 186 from engagement with adjacent trays 58, viz. the foremost tray being in registration with the molding dies and the succeeding tray in a position to be moved into registration with the molding dies at the completion of a molding cycle.

As the pistons 207 approach their lowermost positions, the collar 216 on the lower end of one of the piston rods 208 engages the arm 223 on the member 218, actuating the member 218 and switch LS6 controlling solenoid valve means (not shown) for directing compressed air into the cylinder 157, exerting pressure on the left side of the piston 163 to move the piston in a right-hand direction as viewed in FIG. 2, retracting the yoke 106 to its initial position to receive a succeeding tray 58 and mat carried thereby from the conveyor rolls 102, shown in FIG. 1.

The upper and lower molding die assemblies each comprises a plurality of molding die sections 38 and 40 in the embodiment illustrated, these being nine upper and lower sections for molding nine connected tile configurations at one molding operation. Portions of the molding die sections are particularly shown in FIGS. 6, 7 and 8.

As shown in FIG. 1, each of the die sections is substantially square in the embodiment illustrated, the pairs of mating die sections 38 and 40 being arranged to mold a batt or mat of fibers into nine tile configurations or fibrous bodies 230 in connected relation, the tiles being shown in FIGS. 12 and 13.

Figure 18:
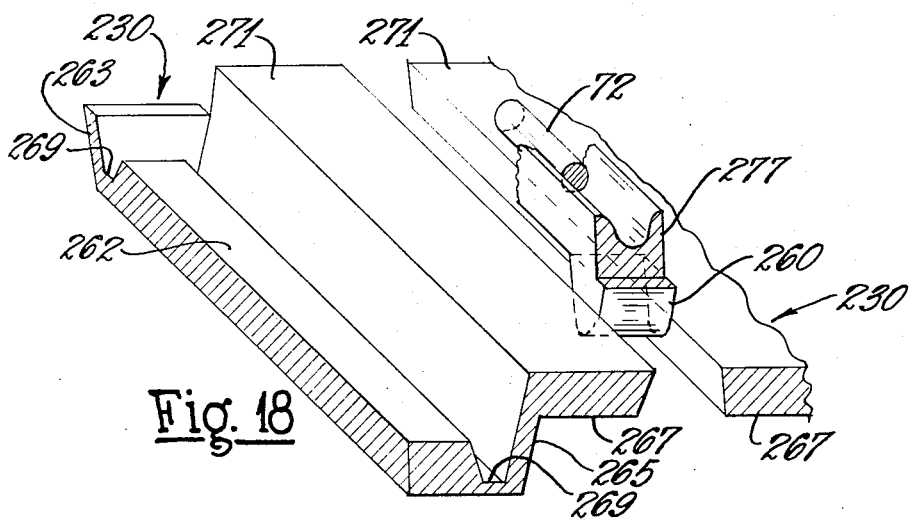
FIG. 18 is an enlarged fragmentary isometric view illustrating a portion of one of the fibrous bodies or tiles formed by the molding dies.

As particularly shown in FIGS. 6 and 7, each of the lower die sections 40 is fashioned with a pair of upwardly extending peripherally disposed rectilinear ridges, each of the ridges 232 forming a recess 269 on the reverse side of each tile configuration 230 as shown in FIGS. 13 and 18. Disposed adjacent the die sections 38 are transversely extending members 234 and 236, shown in FIG. 7, which define one pair of opposed edges of a tile 230 shown in FIG. 13.

The die sections 38 of the middle transverse row are bounded on opposite sides by transverse members or severing bars 236, and the die sections 38 of the first and third transverse rows bounded by outer members 234 and the members 236, which extend parallel with the end frame members 60 of the tray 58, the tray being disposed in the molding facility or press, as shwon in FIG. 6, during a molding application.

The die sections 38 of the middle lengthwise row are bounded on the other opposite sides by lengthwise members or severing bars 246, and the opposite sides of the sections 38 of the first and third lengthwise rows are bounded by outer members 244 and the members 246.

Each of the lower die sections 40 is fashioned with a second pair of raised ridges or rectilinear projections 238, shown in FIG. 8, which are disposed normal to the pair of ridges or projections 232. The pairs of rectilinear ridges 232 and 238 define a square continuous linear ridge forming the recess 269, shown in FIGS. 17 and 18, in each of the molded fibrous bodies or tiles 230. As shown in FIGS. 6 and 7, the member 234 is fashioned with an angular surface 240 and the member 236 fashioned with a similar angular surface 241, shown in FIG. 6, the angularities of these surfaces being parallel with the angularities of the exterior surfaces of the linear ridges 232.

Each member 244 is provided with an angular surface 248 which is slightly spaced from and parallel with an angular surface 252 of a rectilinear ridge 238 on a lower die 40. Each of the members 246 is fashioned with angularly arranged surfaces 250 which, as shown in FIG. 8, are slightly spaced from angular surfaces 252 on the adjacent die sections 40, each member 246 being supported by bolts 261, one being shown in FIG. 8. Each member 244 has a depending shearing bar portion 254 which, during upward movement of the adjacent lower die sections 38, cooperates with a trim plate or block 255 to sever or trim the excess fibers extending outwardly beyond the trim plate 255 except for spaced connecting bridges or connecting portions (not shown) of the character illustrated in FIGS. 17 and 18.

Each of the members 246 has a depending shearing bar portion 257 which cooperates with trim plates or blocks 258. In the upward movement of the lower die sections 40, the shear bar 257 cooperates with the trim plates 258 to sever from the tile sections the fibers adjacent the bar 257. The bars 257 sever the fibers connecting the adjacent tile sections except for bridge or connecting portions 260, shown in FIGS. 17 and 18, and hereinafter further described.

The lengthwise extending support wires 72 and 73 are disposed beneath the members 246, one of these members being illustrated in FIG. 8. The transversely extending wires 77 and 80, adjacent end members 60 of the frame or carrier 58 support the mat adjacent the rails, the wire 80 being illustrated in FIGS. 6 and 9. The intermediate wires 78 and 79, wire 79 being illustrated in FIG. 6, are disposed between the adjacent die sections 40 and in vertical alignment with the severing bar 237 of each of the members 236. From the foregoing it will be apparent that the wires, providing a mat supporting grid when in position in the molding press as shown in FIGS. 6, 7 and 8, are disposed in open spaces 251 separating each die section 40 and its mounting pad or backing plate 42 from each of the other die sections and adjacent mounting plates.

In the construction of the mold arrangement, an important feature resides in mounting each of the individual pairs of die sections 38 and 40 respectively on pairs of backing plates or pads 36 and 42, each plate being independent of the other plates. The die heating manifolds 29 and 44 are of a size embracing the entire molding area of all the die sections, each manifold being of substantially square configuration and each being a single member containing channels accommodating die-heating circulating fluid.

As shown in FIGS. 6 through 8, there is an independent backing plate, platen or pad 36 for each molding die section 38 and an individual backing plate, platen or pad 42 for each of the individual lower die sections 40.

As the pads 36 and 42 are in contiguous engagement with the heating manifolds 29 and 44 respectively, heat is transferred from the manifolds 29 and 44 more rapidly to the respective pads 36 and 42 by conduction than the transfer of heat to the air spaces above and below the heating manifolds whereby there is a tendency for the heating manifolds to be distorted.

In the arrangement shown in FIGS. 6, 7 and 8, each of the pads or backing plates 36 is secured to the upper heating manifold 29 by screws 243 or other suitable means. The upper pads 36 are slightly spaced laterally, one from another by spaces 242, shown in FIGS. 6, 7 and 8, which facilitate expansion and contraction of each pad 36 and each individual die section 38 independently of expansion and contraction of the other pads 36 and die sections 38 so that any tendency for distortion of the pads 36 and the upper die sections 38 is substantially eliminated.

Each of the severing knives or bars 234 is secured to or mounted by the backing plate 36, and each of the knives or shearing members 236 is secured in position by bolts 247 extending through openings in the manifold 29, one of which is shown in FIG. 6. Each upper die section 38 is supported upon ledges 235 provided by the angular surfaces on members 234 and 236. Each of the shearing knives 246 is supported by bolts 261 extending through openings in the manifold 29, one of the bolts being shown in FIG. 6.

The platens, backing plates or pads 42, individual to the lower die sections 40, are spaced one from another by spaces 251, shown in FIGS. 6, 7 and 8 and each plate is secured to the heating manifold 44 by screws 253. Each of the lower die sections 40 is secured to its adjacent pad or backing plate 42 by suitable (not shown). Through the individual mountings of the lower die sections 40 on the backing plates or pads 42, any tendency for distortion of the pads 42 and die sections 40 is substantially eliminated.

The entire area of the mat of fibers contiguous with the nine square die sections is supported by the wires, which are disposed in the spaces 251, and do not interfere with the closing of the mold sections and the severing of the compressed fibers in forming the plurality of molded tile sections. Upon completion of a mat compressing and molding cycle and the dies opened to the position shown in FIG. 6, the strips of waste fibers 275 and 277, shown in FIGS. 17 and 18, between adjacent die sections 40 are still supported by the longitudinally and transversely extending wires. As the waste strips of fibers are connected together and to the tile sections through the bridge portions 260, the tiles are held together as an assemblage. The waste strips of fibers adjacent each of the side rails 64 are connected by the bridge or connecting portions of the character shown in FIGS. 17 and 18 so that all of the molded tile sections are connected with the waste strips through the bridge portions whereby all of the tiles are still supported by the grid-like wire construction and the side rails 64.

Figure 17:
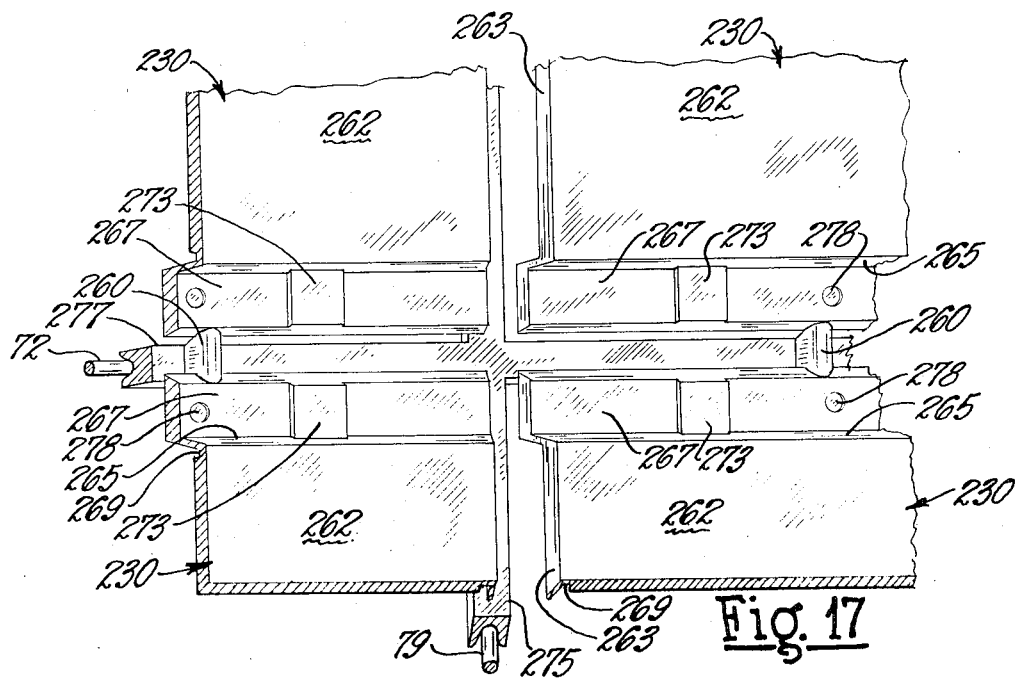
FIG. 17 is an isometric view illustrating portions of adjacent tiles showing the orientation of adjacent tiles after the same have been formed in the molding facility.

The relationship or orientation of adjacent molded bodies or tile sections 230 is particularly illustrated in FIGS. 17 and 18. In FIG. 17, the portions of four adjacent tiles or bodies 230 are illustrated in severed condition except for the integral connecting bridges 260. FIG. 18 illustrates portions of two adjacent tiles 230 on an enlarged scale and in inverted condition to particularly illustrate the bridge connections 260. Each tile section 230 has a square planar central region 262 of fibers compressed to a comparatively high density preferably in a range of from ten to eighteen pounds per cubic foot to provide a substantially rigid section.

Each tile section is bounded on one pair of opposed edge regions by flanges 263, the fibers of which are preferably compressed to a greater density than the fibers at the central region 262. The flanges 263 are molded in the space between the rectilinear ridges 232, 238 and the angular surfaces 240, 241, 248 and 250 formed in the upper die sections as shown in FIGS. 6 and 8. The other pair of oppositely disposed edge configurations or regions of a tile section 262 are compressed to form flange portions 265 shown in FIGS. 17 and 18.

The flange regions or portions 265 are molded or formed between the angular surfaces 252 on a lower die section 40 and angular surfaces 248 and 250 formed on the members 244 and 246. The edge regions or flanges 265 are fashioned with integral projections, extensions or tabs 267, shown in FIGS. 17 and 18, the fibers in the tabs 267 being compressed but not to the extent of compression of the fibers in the edge regions 263 and 265. The central planar section 262 of each tile 230 is integrally joined with the pairs of flanges 263 and 265 by connecting or bridge portions 269 of highly compressed fibers, as shown in FIGS. 18.

In the installation of the individual tile sections 230 for surfacing ceilings, walls or the like, the lower surface 271 of each of the tabs 267 is adapted to engage support means such as furring strips, walls or ceiling surfaces. The terminal edges of the flanges 263 are of a height above the surfaces 271 of tabs 267 so as to accommodate tabs of adjacent tiles. As shown in FIG. 17, each of the tabs 267 is molded with lengthwise spaced raised pads 273, which, when assembled with adjacent tiles, engage the terminal edges of the flanges 263 to provide proper alignment of the tiles and support for the central regions through the flanges 263.

FIGS. 17 and 18 illustrate the configuration and orientation of adjacent tile sections as they are shaped in the mold at a completion of the molding cycle. In FIG. 17, the rectilinear strips or portions 274 of fibers on the wires 77, 78, 79 and 80, the wire 79 being shown in FIG. 17, are severed from the edge portions 263. The rectilinear strips or portions 277 of fibers supported by the wires 72 and 73, the wire 72 being shown in FIG. 17, are severed from the tile sections 230 by the severing bars 257, the strips 275 and 277 being integrally connected at the crossing junctions of the support wires, as shown in FIG. 17.

The strip portions 277 are severed from the tiles except at the bridge or connecting portions 260 which serve to maintain all of the tiles in position on the support wires. The bridge sections 260 may be severed after the nine molded tile sections are removed from the mold facility. The provision of the connecting bridges 260 facilitate the removal from the mold of a mat carrier 58 and the nine molded tile sections mounted by the supporting wires of the carrier.

Suitable resiliently mounted conventional knock-out pins (not shown) are carried by the members 244 and 246 which are displaced by the extensions or tabs 271 of compressed fibers when in the molding die, the pins slightly indenting the pad portions 267 at the regions indicated at 278 in FIG. 17. The knock-out pins avoid adherence of the tile sections to the upper die sections 38 when the mold is opened after a molding cycle.

With reference to FIGS. 1 and 2, means is provided at station D for receiving a carrier or tray 58 bearing a molded product delivered from the molding press. Disposed forwardly of the molding press 10 is a rectangular frame 280 comprising side rails 282 and rails 283 normal thereto. The rails 282 and 283 are equipped with bearing balls 285 which are adapted to be engaged by the lower surfaces of the end strips 62 and the lower surfaces of the side rails 64 of the carrier or tray 58 when the carrier is pushed or delivered forwardly from the molding press 10.

Additional frame members 287 associated with the frame 280 may be equipped with anti-friction rollers 289 to facilitate conveying a tray and the molded product carried thereby away from its position on the bearing balls 285 for further processing.

Figure 19:
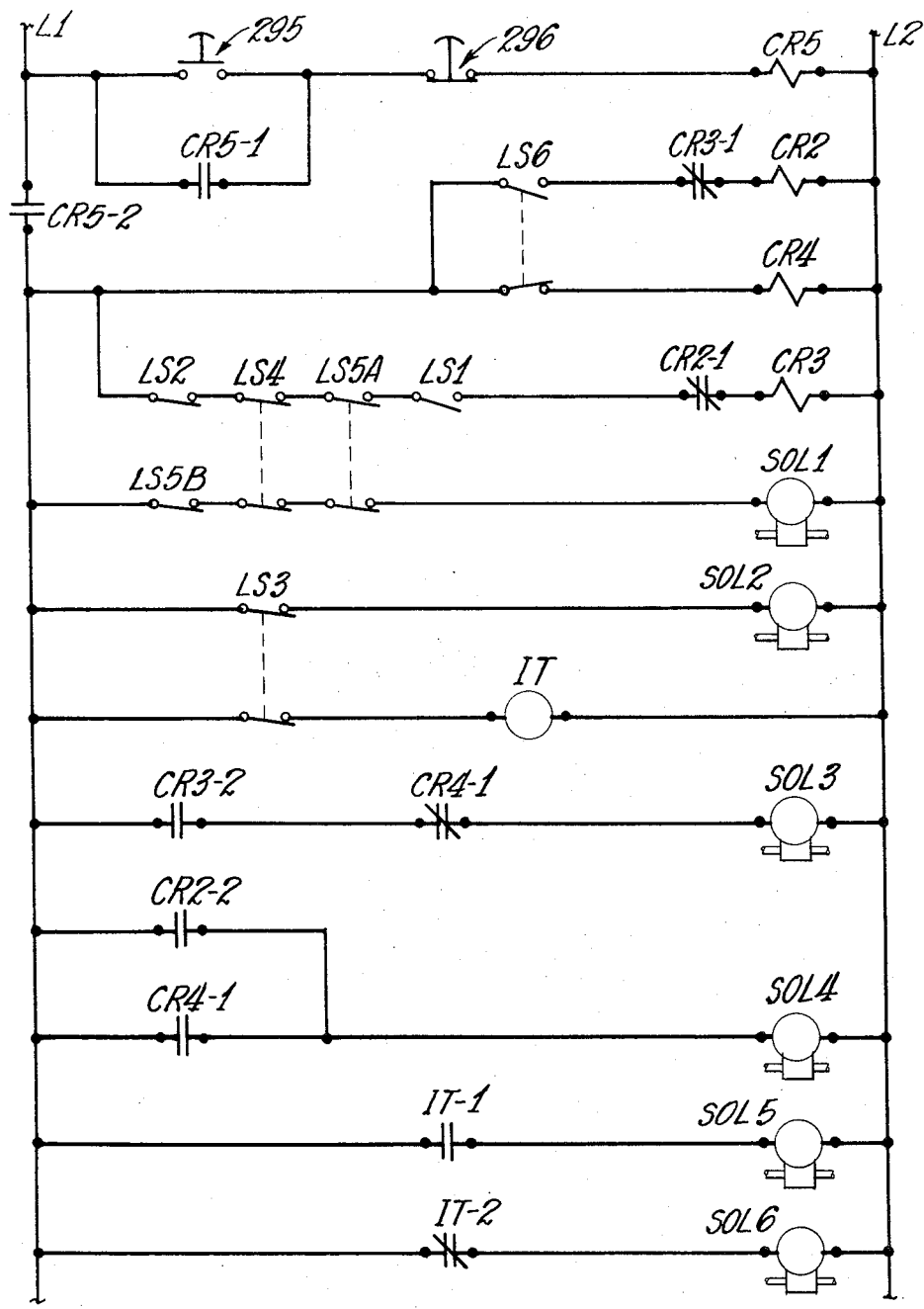
FIG. 19 is a schematic diagram of control circuits and actuators for operating components of the apparatus.

The control circuits and components associated with the apparatus are schematically illustrated in FIG. 19 and reference is made to these components in the explanation of the operation. The operation of the arrangement in forming a molded product is as follows: With reference first to FIG. 1, a tray or carrier 58 bearing a mass or mat 56 of fibers, preferably mineral fibers such as glass fibers, containing a heat-curable binder, such as phenolformaldehyde, is advanced from station A toward the press 10 on the roller conveyor 97 or other suitable conveying means to station B.

In the circuit diagram, FIG. 19, current supply lines L1 and L2 provide current for the control circuits. The current supply may be conventional alternate current of a desired voltage. When a carrier is disposed at station B, the operator depresses a push button switch 295 which completes a circuit energizing contact relay CR5, the switch 295 being held closed through contacts CR5-1 and an operating circuit established through contact CR5-2.

Assuming that the yoke is in its forward position in the press, a limit switch LS6 is in a position where the pins 184 and 186, shown in FIG. 16, are withdrawn from engagement with trays 58, this switch energizing the relay CR4. This energizes solenoid SOL4 through contacts CR4-1. The solenoid SOL4 actuates a valve which admits air under pressure into the cylinder 157 at the left of the piston 163 as viewed in FIG. 2 retracting the tray-moving yoke 106 in a right-hand direction, to its retracted position shown in FIG. 2.

Assuming that a tray or carrier 58 bearing a mat or mass of binder-bearing uncompressed fibers 56 is disposed on the roller conveyor 97, shown in FIG. 1, the tray and mat are moved along the roller conveyor onto the bearing balls 140 at station B until the end strip or bar 62 engages the rollers 118 as shown in FIG. 5. The magnets 144 carried by the stationary frame member 94 bias or hold the end rail or strip 62 in engagement with the rollers 118. The magnets 152, carried by the stationary plate 132, bias the mat carrier 58 into engagement with the rollers 148 mounted on the plate 132, a side rail 64 of the tray engaging the rollers 148. The carriers 58 or trays are constructed so that either end may be in the lead position. The magnets 144 and 152 hold the mat carrier in proper alignment during its movement into registration with the molding dies of the molding press.

As the tray moves onto the yoke or carrier advancing means 106, limit switches LS5A and LS5B are closed by the tray thereby energizing valve actuator solenoid SOL1. This valve directs pressure fluid, such as compressed air, into the lower ends of the cylinders 200 and 206, shown in FIGS. 14 and 16. The piston rod 208 in cylinder 206 is elevated to position the collar or member 210 preparatory to receive the ledge 214 on the block 180, while fluid pressure in the lower end of cylinder 200 elevates the piston rod 202, the block 180 and the pins 184 and 186, engaging the pins in openings 194 in the side rails or bars 64 of adjacent carriers 58, viz. the carrier in registration with the molding dies being engaged by pins 186, and the carrier 58 supporting a mat or mass 56 of unmolded fibers being engaged by the pins 184 in the manner shown in FIG. 14.

The block 180 and the pins 184 and 186 are held in tray-engaging positions by engagement of the detent 192 with the lower recess 191 in the block 180. When the block 180 reaches its uppermost position with the pins 184 and 186 engaged with tray rails 62, limit switch LS2 is closed and limit switch LS6 is opened. Solenoid SOL4 is de-energized and relay CR3 is energized through contact CR3-2 which energizes solenoid control valve SOL3.

The valve energized by solenoid SOL3 admits compressed air or other fluid under pressure into the right-hand end of the cylinder 157, shown in FIG. 2, to advance the piston 163, rod 162 and the tray moving yoke 106 comprising members 107, 108 and 110 in a left-hand direction, advancing the carrier 58 bearing an uncompressed mat or mass of fibers 56 into registration with the dies in the molding press, the yoke 106 concomitantly pushing the tray 58 carrying a molded and cured product away from the press in a left-hand direction. The movement of the trays or carriers 58 under the influence of the yoke occurs by reason of the engagement of the pins 184 and 186 with both adjacent trays or carriers.

When the tray advancing yoke reaches its extreme left-hand position, as viewed in FIG. 2, the tray bearing the uncompressed mat of fibers is in registration with the dies 38 and 40 in the press, the limit switch LS3 is closed, energizing the solenoid SOL2. The energization of SOL2 actuates valve means directing compressed air into the upper ends of cylinders 200 and 206, shown in FIG. 14 and 15. Pressure in the upper end of cylinder 200 moves the plunger or rod 202 to its lowermost position out of the path of the block 180 when moved to retracted position. Pressure in the upper end of cylinder 206 moves the piston 207 downwardly which moves the block 180 and pins 184 and 186 downwardly withdrawing the pins from engagement with the end strips or bars 62 on adjacent trays 58. Downward movement of the piston 207 engages a collar 216 with a toggle member 226 to close a limit switch LS6 and open switch LS2.

At the same time a timer IT is energized and the solenoid valve means SOL5 energized through the timer contacts IT-1. The solenoid SOL5 actuates valve means for directing fluid pressure such as oil under pressure into the lower end of a cylinder 52 of a hydraulic actuator beneath the ram 49, shown in broken lines in FIG. 2, elevating the piston 51 which raises or elevates the lower dies 40 to closed position. Upward movement of the dies 40 compresses the mat of fibers 56, shown in FIG. 6, into the molded configuration or tiles with the dies in closed position as illustrated in FIGS. 7 and 8.

Heated fluid, such as oil, flows continuously through the passages in the plates 29 and 44 disposed above and below the die sections 38 and 40 to heat the die sections and thermally cure the binder in the compressed fibers disposed in the mold. When the block 180 and pins 184 and 186 are moved downwardly by the hydraulic actuator or cylinder 206, limit switch LS2 is opened de-energizing relay CR3 and solenoid SOL3, and limit switch LS6 is closed energizing relay CR2 and solenoid SOL2. The closing of limit switch LS6 energizes relay CR4 which energizes the solenoid SOL4. This solenoid actuates a valve directing compressed air into the left-hand end of the cylinder 157, shown in FIG. 2, which moves the piston 163 and the yoke or tray moving means or yoke 106 to its retracted position shown in FIG. 2, and closing switch LS4.

This return movement of the tray advancing means or yoke places the yoke in a position to receive a succeeding mat carrier or tray 58 bearing an uncompressed mat or mass of binder bearing fibers into a position adjacent the yoke in preparation for subsequent movement or delivery into the molding press simultaneously with the removal of a tray bearing a molded product from the region of the dies. When the cure time has expired viz. when the timer IT times out, opening contact IT1, the solenoid SOL5 is de-energized.

At the same time the solenoid SOL6 is energized through timer contacts IT-2, actuating valve means directing oil under pressure above the piston 51 in the cylinder 52 beneath the movable ram 49 of the press to lower the ram, thus opening the dies 40. As the ram moves downwardly, the mat carrier and molded product move downwardly with the ram. This downward movement continues until the end bars 62 of the mat carrier are engaged with the upper surface of the yoke guiding member 112, the member 112 being shown in FIGS. 5 and 6.

As the press ram continues its downward movement the mat carrier 58 and the molded product supported thereby are maintained in an intermediate position between the upper dies 38 and the lower dies 40 so that the mat carrier and molded product may be moved away from the molding dies and a succeeding mat carrier and uncompressed fibrous mat moved into registration with the molding dies. The ram 49, upon reaching its lowermost position, opens limit switch LS1 thereby completing a molding cycle. An emergency stop switch 296 is in circuit with the switch 295.

When a succeeding tray 58 and mat of uncompressed fibers are moved into a position at station B to be advanced into the molding facility, such positioning of the succeeding tray effects closing of switches LS5A and LS5B to initiate a succeeding molding cycle. The operative connection between two trays 58 and the tray advancing yoke 106 is established through engagement of the pins 184 and 186 in openings 194 in the corner regions of the end members or bars 62 of the mat carriers 58.

Through the above described method and arrangement, a plurality of molded products may be formed simultaneously with a consequent reduction in the cost of producing the molded products such as the fibrous bodies or acoustic tiles described herein. The mat carrier or support 58, being of a reticulated or grid-like character through the provision of mat supporting wires, makes possible the molding of a plurality of bodies or units at each molding cycle.

In the illustrated embodiment, the die sections 38 and 40 and the arrangement of mat supporting wires in the mat carrier provide for the simultaneous molding of nine bodies, units or tiles of compressed fibers. It is to be understood that the nuer of units or tiles formed at each molding cycle through the method of the invention may be varied. For example, four bodies or tile units may be molded and maintain a substantially square orientation of the molding facility.

Several molded bodies or units may be simultaneously formed where the units are not in an over-all square orientation. For example, three units in rectilinear orientation may be formed or six units in two rectilinear rows may be formed. If desired, an elongated press may be employed for molding four units or bodies in elongated orientation or eight units in two rectilinear rows may be molded simultaneously. It is found preferable, however, that the total molding area be substantially square so tht the expansion, both lengthwise and widthwise of the molding area, is substantially the same and is at a minimum dimension with a square area.

It is to be understood that the method of advancing the trays carrying the mats of uncompressed fibers to station B may be automated to provide for periodic advance of the trays or carriers 58 along the roller conveyor 97 to a position to be engaged by the yoke or means 106 for delivery into the molding facility in the manner herein described.

It is apparent that, within the scope of the invention, modifications and different arrangements may be made other than as herein disclosed, and the present disclosure is illustrative merely, the invention comprehending all variations thereof.

We claim:

1. Apparatus of the character disclosed including, in combination, a molding press provided with relatively movable mating dies comprising upper die sections and lower mating die sections for molding a mass of compressible binder-bearing fibers into a plurality of connected bodies, means bounding each of said die sections for severing spaced regions of the fibers during closing of the dies to provide a plurality of bodies connected by unsevered regions of the bodies, a relatively movable carrier, said carrier having spaced linear elements mounting a mass of the compressible fibers to be molded, means for supporting the carrier, means for advancing the carrier and the mass of fibers mounted thereby to a region between the molding dies, said spaced linear elements being disposed for alignment with the fiber severing means of the die sections, means for effecting relative closing movement of said dies to compress the fibers to a high density and mold the compressed fibers into a plurality of connected bodies, and means for heating the plurality of connected bodies to set the binder in the fibers during the period that the dies are in closed fiber-compressing position.

2. Apparatus of the character disclosed including, in combination, a molding press having relatively movable mating dies for molding a quantity of compressible binder-bearing mineral fibers into a plurality of connected bodies, a relatively movable carrier, said carrier having spaced linear elements mounting a quantity of the compressible mineral fibers to be molded, means for advancing the carrier and the quantity of mineral fibers mounted thereby to a region between the molding dies, means for effecting relative movement of said dies to compress the mineral fibers to a high density and mold the fibers into a plurality of connected bodies, severing means associated with the die means for severing portions of the compressed fibers in alignment with the spaced linear elements, means for heating the dies to set the binder while the dies are in body molding position, said carrier advancing means being movable to convey the carrier and plurality of molded bodies away from the molding dies after the completion of a molding operation.

3. Apparatus of the character disclosed including, in combination, a molding press provided with mating die means for molding a compressible mass of binder-bearing fibers into a plurality of connected fibrous bodies, a carrier having spaced linear elements supporting the mass of fibers, relatively movable means for advancing the carrier and mass of fibers to the region between the molding dies, means for effecting relative movement of said dies for compressing the mass of fibers to a high density and molding the compressed mass of fibers into a plurality of connected fibrous bodies while the compressed mass of fibers is mounted by the linear elements of the carrier, severing means associated with the die means for severing portions of the compressed mass of fibers in alignment with the spaced linear elements of the carrier, means for curing the binder in the bodies, said relatively movable means being operable to move the carrier and plurality of molded bodies away from the molding dies at the completion of a molding operation.

4. Apparatus of the character disclosed including, in combination, a molding press, mating molding dies mounted by the press, a relatively movable carrier, said carrier having spaced linear elements supporting an uncompressed mass of binder-bearing fibers, relatively movable means to engage and accommodate the carrier mounting the mass of fibers in a position for delivery of the carrier and fibers to the region between the molding dies, motive means for advancing the relatively movable means and a carrier bearing an uncompressed mass of fibers into the region between the molding dies, means for effecting relative movement of the dies for compressing the mass of fibers to a high density and molding the fibers into a plurality of similarly shaped connected fibrous bodies, severing means associated with the molding dies for severing portions of the compressed mass of fibers in alignment with the spaced linear elements of the carrier, heating means for curing the binder in the fibrous bodies while the bodies are maintained in the molding dies, said relatively movable means being operable to eject the carrier and molded bodies away from the molding dies at the completion of a molding operation.

5. The combination according to claim 4 embodying means disposed adjacent said relatively movable means for accurately positioning the carrier relative to the relatively movable means preparatory to movement of the carrier by the relatively movable means into the region of the molding dies.

6. Apparatus of the character disclosed including, in combination, a molding press, mating molding dies mounted by the press, a relatively movable carrier supporting a mass of binder-bearing fibers, relatively movable means to accommodate the carrier and mass of fibers in a position for delivery of the carrier and fibers to the region between the molding dies, said carrier being inclusive of a rectangular metal frame equipped with spaced linear elements supporting the mass of fibers, magnetic means providing forces effective on the metal frame of the carrier for accurately mounting a carrier in position adjacent the relatively movable means preparatory to movement of the carrier and mass of fibers to the region of the molding dies, motive means for advancing the relatively movable means and a carrier bearing a mass of fibers into the region between the molding dies, means for effecting relative movement of the dies for compressing the fibers and molding the fibers into a plurality of similarly shaped fibrous bodies, means for curing the binder in the fibrous bodies, said relatively movable means being operable to eject the carrier and molded bodies away from the molding dies at the completion of a molding operation.

7. Apparatus of the character disclosed, in combination, a molding press, die means mounted by the press for compressing and molding a mass of binder-bearing fibers into a plurality of connected fibrous bodies, said die means including a plurality of upper die sections configurated to form a plurality of molded bodies, said die means including a plurality of lower die sections mating with said upper die sections, means bounding each of said die sections for severing spaced regions of the fibers during closing of the upper and lower die sections to provide a plurality of molded fibrous bodies connected by unsevered regions of the fibers, a carrier having a frame, spaced linear elements carried by the frame for supporting the mass of fibers, said linear elements being disposed for alignment with the fiber severing means of the die sections whereby the linear elements are disposed in the regions bounding the molded bodies without impairing the molding operation, and means for moving said carrier and mass of fibers supported thereby into molding position and for conveying the plurality of molded bodies and the carrier away from the molding die means at the completion of a molding operation.

8. The apparatus to claim 7 including members having channels accommodating circulating heating fluid adjacent said die means for curing the binder in the fibers when the die means are in body molding positions.

9. The apparatus according to claim 7 wherein the spaced linear elements carried by the carrier frame are metal wires.

10. Apparatus of the character disclosed, in combination, a molding press having upper and lower die mounting members, means for effecting relative movement of one member with respect to the other, die heating means mounted by each of said members, each of said die heating means including a heating plate having channels accommodating a circulating heating fluid, a first die assembly mounted by the upper die heating means, a second mating die assembly mounted by the lower die heating means, said die assemblies including groups of pairs of mating die sections for compressing and molding a compressible mass of binder-bearing fibers into a plurality of fibrous bodies of high density, an individual upper backing plate mounting each individual die section of the upper die assembly carried by the upper die heating plate, each of said upper backing plates for the upper die sections being spaced laterally one from another, an individual lower backing plate mounting each individual die section of the lower die assembly, said lower backing plates being mounted by the lower die heating plate, each of said lower backing plates for the lower die sections being spaced laterally one from another, and means associated with each pair of mating die sections for severing spaced regions of the fibers when the upper and lower die assemblies are moved to closed position by relative movement of said members to provide a plurality of molded fibrous bodies connected by unsevered regions of the fibers, the circulating fluid being of a temperature to cure the biner in the molded bodies.

11. Apparatus of the character disclosed for molding a plurality of bodies from a mass of binder-bearing glass fibers comprising, in combination, a molding press having upper and lower platens in which one platen is movable relative to the other, a first die assembly mounted by the upper platen, a second mating die assembly mounted by the lower platen, a die heating manifold mounted by each of said platens, one of said die assemblies including a plurality of individual die sections, the other of said die assemblies including a plurality of mating die sections, an individual backing plate mounting each individual upper die section carried by the upper heating manifold, each of said upper backing plates being spaced laterally one from another, an individual backing plate mounting each lower die section carried by the lower heating manifold, each of said lower backing plates being spaced laterally one from another, said first and second die assemblies being movable to closed position by relative movement of said platens to compress the mass of fibers to a high density between the upper and lower die assemblies, and fiber severing means associated with said die sections for severing fibers at spaced regions between adjacent die sections during movement of the die assemblies to closed position to provide a plurality of molded fibrous bodies connected by unsevered regions of fibers, each of the heating manifolds having passage means accommodating circulating heating fluid the dies to set the binder in the molded fibrous bodies.

12. Apparatus of the character disclosed for molding fibrous bodies from a mass of binder-bearing fibers including a molding press, relatively movable molding dies mounted by the press, means for effecting movement of one of said molding dies with respect to the other to compress the mass of fibers into a plurality of connected fibrous bodies, a carrier mounting a mass of binder-bearing fibers, a relatively movable yoke, means for positioning the carrier adjacent the yoke, means associated with said yoke for establishing operative engagement of said yoke with the carrier, means for effecting movement of said yoke for moving the carrier and mass of fibers mounted thereby into molding position between the molding dies, and means for heating the dies to cure the binder in the molded bodies, said carrier-engaging means being disengageable from the carrier whereby the yoke is retractable to a position to receive a succeeding carrier.

13. Apparatus of the character disclosed for molding fibrous bodies from a mass of binder-bearing fibers including a molding press, relatively movable molding dies mounted by the press, means for effecting movement of one of said molding dies with respect to the other, a carrier mounting a mass of binder-bearing fibers, a relatively movable yoke normally disposed at a station adjacent to and spaced from the molding dies, frame means adjacent said yoke, means associated with said frame means for positioning the carrier adjacent the yoke, relatively movable means associated with said yoke for establishing operative engagement of said yoke with the carrier, means for effecting reciprocatory movement of said yoke for moving the carrier and mass of fibers mounted thereby into molding position in the molding dies, and heating means for the molding dies for curing the binder in the fibrous bodies, said relatively movable carrier-engaging means mounted by the yoke being movable to a position out of engagement with the carrier whereby the yoke is retractable to a position to receive a succeeding carrier.

14. Apparatus of the character disclosed including, in combination, a molding press, relatively movable multisection molding dies mounted by the press for molding a mass of binder-bearing fibers into a plurality of bodies, means for effecting relative movement between the molding dies, a carrier mounting a mass of binder-bearing fibers, conveyor means for supporting the carrier, a relatively movable yoke normally disposed at a station adjacent the molding dies, said yoke adapted to receive a carrier from the conveyor means preparatory to movement of the carrier and mass of fibers mounted thereby to the molding dies, frame means adjacent said yoke, means associated with said frame means for positioning the carrier adjacent said yoke, movable detent means mounted by the yoke for establishing operative connection of the yoke with the carrier, means for effecting reciprocatory movement of said yoke for moving a carrier and mass of fibers mounted thereby into molding position between the molding dies, and guide means associated with said frame means for guiding the carrier to position the mass of fibers between the molding dies, said detent means being disengageable from the carrier whereby the yoke may be retracted to a position to receive a succeeding carrier.

15. The combination according to claim 14 wherein the detent means is engageable with adjacent carriers whereby advancing movement of the yoke toward the press concomitantly moves the molded bodies and supporting carrier away from the molding dies and moves a succeeding carrier and mass of unmolded fibers into the molding dies.

16. Apparatus of the character disclosed including, in combination, a molding press, mating molding dies mounted by the press comprising an upper die and a lower die for molding a mass of binder-bearing fibers into a plurality of fibrous bodies, means for moving one die relative to the other die to effect a molding operation, a carrier supporting a mass of fibers bearing a curable binder, a reciprocable yoke disposed adjacent the molding press accommodating the carrier and mass of fibers mounted thereby, detent means associated with the yoke movable to a position for engagement with the carrier to establish operative connection between the yoke and the carrier, motive means for advancing the yoke to convey the carrier and the fibers supported thereby into registration with the molding dies, means for disengaging the detent means from engagement with the carrier in registration with the molding dies to effect retraction of the yoke without dislodging the carrier and fibers mounted thereby from registration with the molding dies, said molding dies in closed position compressing the fibers and molding the fibers into a plurality of fibrous bodies, and means for re-engaging the detent means on the yoke with the carrier at the molding station whereby subsequent movement of the yoke toward the molding press conveys the carrier and molded fibrous bodies away from the molding press at the completion of a molding operation.

17. Apparatus of the character disclosed including, in combination, a molding press, mating molding dies mounted by the press comprising an upper die and a lower die, means for moving one die relative to the other die to effect a molding operation, said dies arranged to receive successive carriers each supporting a mass of fibers bearing a curable binder, said molding dies in closed position compressing the mass of fibers and molding the fibers into a plurality of fibrous bodies, a reciprocable yoke, detent means associated with the yoke movable to a position for engagement with a carrier in the molding press and with an adjacent succeeding carrier to establish operative connection between the yoke and the carriers, motive means for advancing the yoke to convey the carrier and molded fibrous bodies away from the molding dies and convey the adjacent carrier and the mass of fibers supported thereby into registration with the molding dies, and means for disengaging the detent means from the carriers to effect retraction of the yoke without dislodging the carrier and fibers in registration with the molding dies.

* * * * *